United States Patent
Utermoehlen et al.

(10) Patent No.: US 10,036,655 B2
(45) Date of Patent: Jul. 31, 2018

(54) LINEAR TRAVEL MEASUREMENT APPARATUS AND MEASUREMENT METHOD FOR A COMPRESSION TRAVEL OF AN ELECTRICALLY CONDUCTIVE SPRING AND ALSO A CORRESPONDING SPRING UNIT

(71) Applicant: Robert Bosch GmbH, Stuttgart (DE)

(72) Inventors: Fabian Utermoehlen, Leonberg (DE); Stefan Leidich, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 7 days.

(21) Appl. No.: 15/276,195

(22) Filed: Sep. 26, 2016

(65) Prior Publication Data

US 2017/0089730 A1    Mar. 30, 2017

(30) Foreign Application Priority Data

Sep. 28, 2015   (DE) .......................... 10 2015 218 556

(51) Int. Cl.
*G01D 5/20*    (2006.01)

(52) U.S. Cl.
CPC .................. *G01D 5/2006* (2013.01)

(58) Field of Classification Search
None
See application file for complete search history.

(56) References Cited

U.S. PATENT DOCUMENTS

| | | | | |
|---|---|---|---|---|
| 7,816,911 | B2* | 10/2010 | Taylor ................... | G01D 3/036 324/207.15 |
| 2003/0179003 | A1* | 9/2003 | Toda ..................... | G01D 3/028 324/679 |
| 2013/0119728 | A1* | 5/2013 | Schmitt ................. | B60N 2/54 297/217.3 |

FOREIGN PATENT DOCUMENTS

DE    10 2007 017 308 B4    10/2008

* cited by examiner

*Primary Examiner* — Jermele M Hollington
*Assistant Examiner* — Suresh K Rajaputra
(74) *Attorney, Agent, or Firm* — Maginot, Moore & Beck LLP

(57) ABSTRACT

A linear travel measurement apparatus is configured for a compression travel of an electrically conductive spring. A spring unit includes the linear travel measurement apparatus and a spring. The spring has an electrical contact at each of its ends and is electrically connected to a measurement circuit by corresponding electrical lines as measurement inductance. The measurement circuit detects a change in the measurement inductance, the change caused by the compression travel, and evaluates said change in order to ascertain the spring travel.

10 Claims, 2 Drawing Sheets

LINEAR TRAVEL MEASUREMENT APPARATUS AND MEASUREMENT METHOD FOR A COMPRESSION TRAVEL OF AN ELECTRICALLY CONDUCTIVE SPRING AND ALSO A CORRESPONDING SPRING UNIT

This application claims priority under 35 U.S.C. § 119 to application number DE 10 2015 218 556.7, filed on Sep. 28, 2015 in Germany, the disclosure of which is incorporated herein by reference in its entirety.

BACKGROUND

The disclosure proceeds from a linear travel measurement apparatus for a compression travel of an electrically conductive spring of the generic type of the following description. A spring unit comprising a linear travel measurement apparatus of this kind and a measurement method for a compression travel of an electrically conductive spring are also subjects of the present disclosure.

Externally fitted measurement systems are known from the prior art for detecting a linear travel in a system which is spring-mounted by means of a telescopic spring arrangement, such as in a motorcycle suspension fork for example. Said measurement systems measure the linear travel or the insertion depth of the suspension fork with the aid of a potentiometer and a sliding contact. Disadvantages of this can be considered to include firstly the wear of the measurement system and secondly the exposed position on the outside of the slider tube which can lead to soiling and accordingly to reduced reliability of the measurement system.

Furthermore, MacPherson spring legs which are used, for example, for wheel suspension in motor vehicles are known from the prior art. Here, measurement of the compression can be performed, for example, by means of relatively expensive pressure force sensors.

DE 10 2007 017 308 B4 discloses a spring unit comprising a linear travel sensor which ascertains the changes in distance between two spring turns. Furthermore, the total compression travel is then deduced. The linear travel sensor used is based in one embodiment on the "coupled-coils" principle, that is to say a target on the spring changes the inductive coupling between two sensor coils. In a second embodiment, the target is of resonant design and comprises a resonant circuit. However, measurement of the inductive coupling remains substantially identical.

SUMMARY

The linear travel measurement apparatus for a compression travel of an electrically conductive spring having the features described herein and also the corresponding spring unit having the features described herein and the measurement method for a compression travel having the features described herein have the advantage that the inductance of the spring which acts as an electrical coil itself is used as the measurement inductance. The measurement inductance of the spring, which measurement inductance changes during compression, is then evaluated in order to determine the compression travel. This allows cost-effective measurement of the compression travel of the spring without an additional sensor system.

Embodiments of the disclosure directly measure the compression travel by means of the change in inductance, which change is caused by compression of the spring, and an external capacitor with a constant capacitance by means of the resonant frequency of the corresponding resonant circuit in which the spring represents the measurement inductance. This means that embodiments of the disclosure preferably ascertain and evaluate the resonant frequency of the resonant circuit which is formed by the spring itself and an external capacitor.

Embodiments of the present disclosure provide a linear travel measurement apparatus for a compression travel of an electrically conductive spring. Here, the spring has electrical contacts at its ends and is electrically connected to a measurement circuit by means of corresponding electrical lines as measurement inductance, which measurement circuit detects a change in the measurement inductance, which change is caused by the compression travel, and evaluates said change in order to ascertain the spring travel.

The disclosure additionally proposes a spring unit having an electrically conductive spring and a linear travel measurement apparatus of this kind. The corresponding measurement method for the compression travel of an electrically conductive spring makes electrical contact with the spring at its ends and the spring is used as a measurement inductance, wherein a change in the measurement inductance, which change is caused by the compression travel, is detected and evaluated in order to ascertain the spring travel.

Advantageous improvements to the linear travel measurement apparatus, which is specified in the following description, for a compression travel of an electrically conductive spring are possible owing to the measures and developments set out in the following description.

It is particularly advantageous that the measurement circuit can have an external capacitance and/or an evaluation and control unit. In the present case, the evaluation and control unit can be understood to mean an electrical device, such as a control device for example, which processes and/or evaluates detected measurement signals. The evaluation and control unit can have at least one interface which can be hardware-based and/or software-based. In the case of a hardware-based design, the interfaces can be, for example, part of a so-called system ASIC which contains an extremely wide variety of functions of the evaluation and control unit. However, it is also possible for the interfaces to be dedicated, integrated circuits or to at least partially comprise discrete components. In the case of a software-based design, the interfaces can be software modules which are provided, for example, on a microcontroller in addition to other software modules. Also advantageous is a computer program product with program code, which is stored on a machine-readable medium such as a semiconductor memory, a hard disk or an optical memory and is used to carry out the evaluation when the program is run by the evaluation and control unit.

In an advantageous refinement of the linear travel measurement apparatus, the evaluation and control unit can comprise, for example, a DC/DC converter which can measure a measurement voltage across an external capacitance which can be charged with the electrical energy of the measurement inductance, wherein the measurement voltage can represent a current value of the measurement inductance.

In addition or as an alternative, the evaluation and control unit can comprise a bridge circuit with a reference inductance, wherein the measurement inductance can be looped into a bridge branch.

In a further advantageous refinement of the linear travel measurement apparatus, the evaluation and control unit can apply a DC voltage to the measurement inductance and convert the rising current by means of an amplifier into a measurement voltage which represents the current value of the measurement inductance.

In a further aspect, it can be provided that the external capacitance forms a parallel resonant circuit or a series resonant circuit with the measurement inductance of the spring. The evaluation and control unit can measure a resonant frequency and/or a resonant resistance and/or resonant conductance of the corresponding resonant circuit and ascertain the measurement inductance from the measurement value. This allows particularly simple and cost-effective measurement of the measurement inductance of the spring. In addition, the evaluation and control unit can comprise a phase locked loop and determine a phase relationship between an exciting sinusoidal signal and a voltage across the series resonant circuit or a current through the series resonant circuit by means of the phase locked loop.

Exemplary embodiments of the disclosure are illustrated in the drawing and will be explained in greater detail in the following description. In the drawing, like reference symbols denote components or elements which execute the same or similar functions.

DETAILED DESCRIPTION

Figure 1:
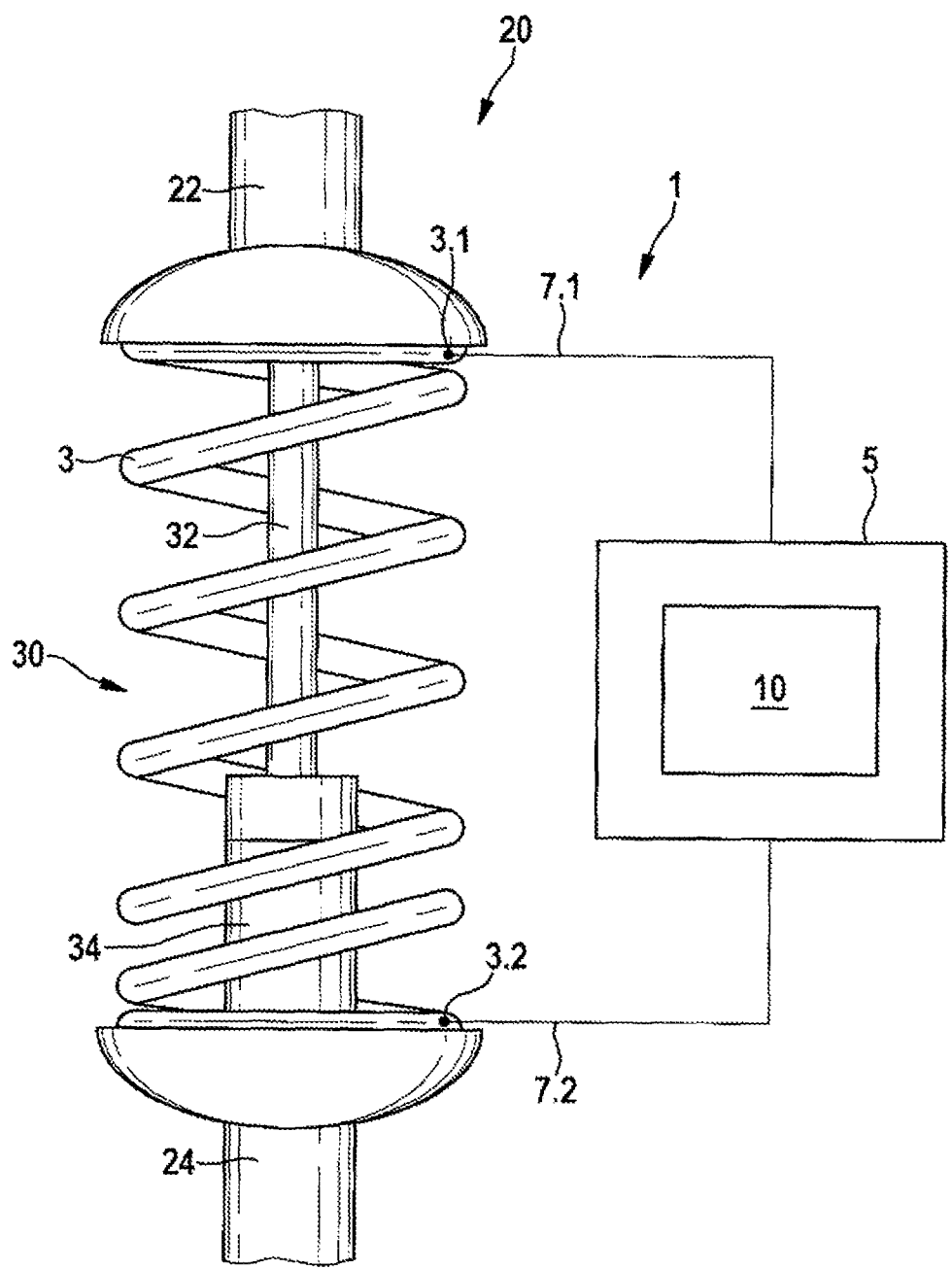
FIG. 1 is a schematic illustration of an exemplary embodiment of a spring unit comprising a linear travel measurement apparatus according to the disclosure for a compression travel of an electrically conductive spring.
Figure 2:
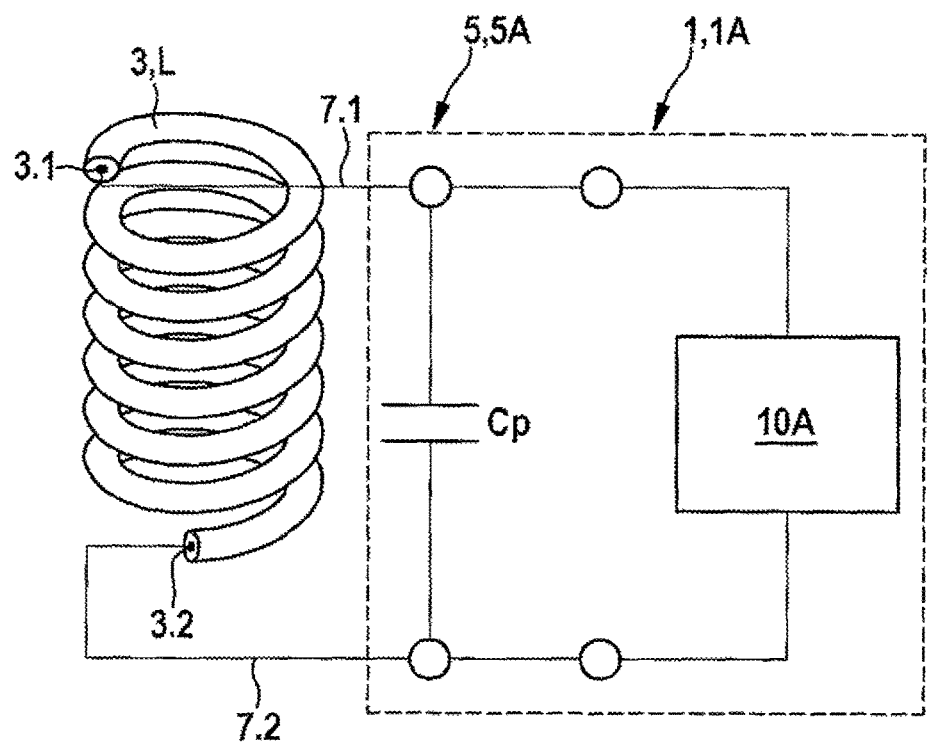
FIG. 2 is a schematic illustration of an exemplary embodiment of a linear travel measurement apparatus according to the disclosure for a compression travel of an electrically conductive spring for the spring unit from FIG. 1.
Figure 3:
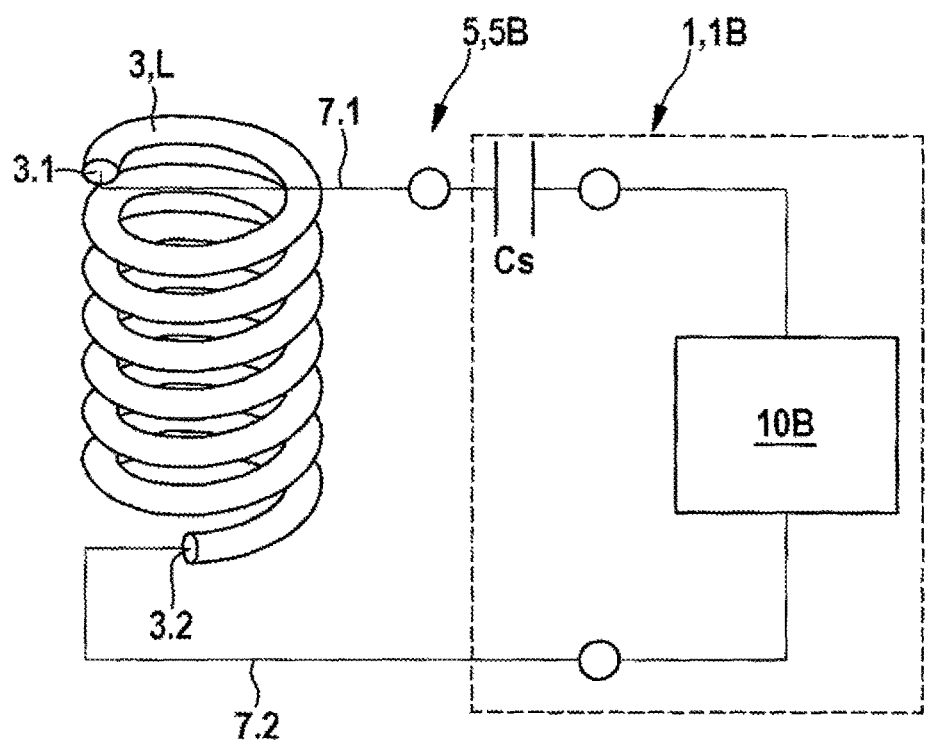
FIG. 3 is a schematic illustration of a further exemplary embodiment of a linear travel measurement apparatus according to the disclosure for a compression travel of an electrically conductive spring for the spring unit from FIG. 1.

As is clear from FIGS. 1 to 3, in the illustrated exemplary embodiments of a linear travel measurement apparatus 1, 1A, 1B for a compression travel, a corresponding electrically conductive spring 3 has electrical contacts 3.1, 3.2 at its ends and is electrically connected to a measurement circuit 5, 5A, 5B by means of corresponding electrical lines 7.1, 7.2 as measurement inductance L. The measurement circuit 5, 5A, 5B detects a change in the measurement inductance L, which change is caused by the compression travel, and evaluates said change in order to ascertain the spring travel. By way of example, the spring 3 in the illustrated exemplary embodiments is designed as a spiral spring.

In the illustrated exemplary embodiments, the electrically conductive spring 3 acts, in principle, as a coil, of which the inductance L can be calculated in accordance with equation (1).

$$L = \mu_0 * (N^2 * A / l) \quad (1)$$

Here, $\mu_0$ denotes the magnetic field constant, N denotes the number of turns, A denotes the cross-sectional area and l denotes the length of the spring 3 or coil. Apart from the length, all of the variables remain virtually identical during compression of the corresponding spring 3 and the inductance L increases owing to the compression of the spring 3. In the case of typical spring dimensions, such as length in the uncompressed state $l_{max}=0.2$ m, number of turns N=7 and diameter d=0.1 m, the measurement inductance L has values of a few $\mu H$ which, when connected to an external capacitor with a value C=500 pF, can produce a resonant frequency of a few MHz. The sensitivity, that is to say the change in frequency per compression operation, is greater than 100 kHz/cm and is therefore easily detectable.

As is also clear from FIG. 1, a spring unit 20 which is designed as a MacPherson spring unit comprises two mounting ends 22, 24. A plate is arranged at the two mounting ends 22, 24 in each case, and the electrically conductive spring 3, which is designed as a spiral spring, is tensioned between said plates. A shock absorber 30 of variable length and with a piston 32, which is accommodated in an axially displaceable manner in a cylinder 34, is arranged centrally between the mounting ends 22, 24, wherein the axial movement of the piston 32 in the cylinder 34 is damped by suitable measures. As already stated above, the spring 3 acts as an electrical coil, of which the current inductance or measurement inductance L, which represents the compression travel, is measured by the measurement circuit 5, 5A, 5B. The illustrated spring unit 20 is preferably used as a spring leg in the chassis region of a vehicle. It is fitted in said chassis region such that it compresses in the event of chassis movements against the force of the spring 3, so that the mounting points 22, 24 move in a linear manner in relation to one another. This movement is damped by the shock absorber 30. The compression travel of the corresponding spring 3 is measured by the linear travel measurement apparatus 1, 1A, 1B according to the disclosure. The corresponding information about the compression travel can be used to adaptively adjust the suspension of the vehicle. In the illustrated exemplary embodiment, the electrical lines 7.1, 7.2 are each routed out at a respective end of the spring 3. The two electrical lines 7.1, 7.2 can optionally be routed out at one end of the spring 3, wherein one of the lines 7.1, 7.2 is guided from one of the electrical contacts 3.1, 3.2, through the center of the spring 3, to the other spring end for this purpose.

A large number of suitable methods for measuring an inductance are known. A particularly simple embodiment is provided by connecting the measurement inductance L in a resonant circuit 5A, 5B having an additional capacitance Cp, Cs which is to be inserted, and measuring the corresponding resonant frequency.

As is further clear from FIGS. 2 and 3, the measurement circuit 5 in the illustrated exemplary embodiments has a respective external capacitance Cp, Cs and an evaluation and control unit 10A, 10B. The spring 3 or the measurement inductance L of the spring 3 is used as a frequency-determining element in a corresponding resonant circuit 5A, 5B.

As is further clear from FIG. 2, the external capacitance Cp in the illustrated first exemplary embodiment forms a parallel resonant circuit 5A with the measurement inductance L of the spring 3. The evaluation and control unit 10A then measures a resonant frequency and/or a resonant resistance and/or resonant conductance of the corresponding resonant circuit 5A and ascertains a current value of the measurement inductance L from the measurement value, said current value of the measurement inductance representing a current compression travel of the spring 3.

As is further clear from FIG. 3, the external capacitance Cs in the illustrated second exemplary embodiment forms a series resonant circuit 5B with the measurement inductance L of the spring 3. The evaluation and control unit 10B measures a resonant frequency and/or a resonant resistance and/or resonant conductance of the corresponding resonant circuit 5B and ascertains a current value of the measurement inductance L from the measurement value, said current value of the measurement inductance representing a current compression travel of the spring 3. In addition, the evaluation and control unit 10B can comprise a phase locked loop and determine a phase relationship between an exciting sinusoidal signal and a voltage across the series resonant circuit 5B or a current through the series resonant circuit 5B by means of the phase locked loop.

In an alternative embodiment, not illustrated in any detail, the evaluation and control unit 10 can have a DC/DC converter which measures a measurement voltage across an external capacitance which is charged with the electrical energy of the measurement inductance L. Here, the measurement voltage represents the current value of the measurement inductance L. As a further alternative, the evaluation and control unit 10 can comprise a bridge circuit with a reference inductance, wherein the measurement inductance is looped into a bridge branch. Furthermore, the evaluation and control unit 10 can apply a DC voltage to the measurement inductance L and converts the rising current by means of an amplifier into a measurement voltage which represents the current value of the measurement inductance L.

Embodiments of the measurement method according to the disclosure for ascertaining a compression travel of an electrically conductive spring 3 make electrical contact with the spring 3 at its ends 3.1, 3.2 and use the spring 3 as a measurement inductance L, wherein a change in the measurement inductance L, which change is caused by the compression travel, is detected and evaluated in order to ascertain the spring travel.

What is claimed is:

1. A linear travel measurement apparatus for a compression travel of an electrically conductive spring, the apparatus comprising:
    a measurement circuit electrically connected to the spring by an electrical contact at each end of the spring and by electrical lines extending from the electrical contacts as measurement inductance, the measurement circuit configured to detect a change in the measurement inductance, the change caused by the compression travel, the measurement circuit further configured to evaluate the change to ascertain the spring travel.

2. The apparatus according to claim 1, wherein the measurement circuit has at least one of (i) an external capacitance and (ii) an evaluation and control unit.

3. The apparatus according to claim 2, wherein:
    the evaluation and control unit comprises a DC/DC converter configured to measure a measurement voltage across an external capacitance which is charged with the electrical energy of the measurement inductance, and
    the measurement voltage represents a current value of the measurement inductance.

4. The apparatus according to claim 2, wherein:
    the evaluation and control unit comprises a bridge circuit with a reference inductance, and
    the measurement inductance is looped into a bridge branch.

5. The apparatus according to claim 2, wherein the evaluation and control unit is configured to apply a DC voltage to the measurement inductance and convert the rising current by an amplifier into a measurement voltage which represents the current value of the measurement inductance.

6. The apparatus according to claim 2, wherein the external capacitance forms a parallel resonant circuit or a series resonant circuit with the measurement inductance of the spring.

7. The apparatus according to claim 6, wherein the evaluation and control unit is configured to measure at least one of a resonant frequency and a resonant resistance and a resonant conductance of the corresponding resonant circuit and ascertain the measurement inductance from the measurement value.

8. The apparatus according to claim 6, wherein the evaluation and control unit comprises a phase locked loop and determines a phase relationship between an exciting sinusoidal signal and a voltage across the series resonant circuit or a current through the series resonant circuit by the phase locked loop.

9. A spring unit, comprising:
    an electrically conductive spring; and
    a linear travel measurement apparatus configured to measure a compression travel of the electrically conductive spring, the linear travel measurement apparatus comprising a measurement circuit electrically connected to the spring by an electrical contact at each end of the spring and by electrical lines extending from the electrical contacts as measurement inductance, the measurement circuit configured to detect a change in the measurement inductance, the change caused by the compression travel, the measurement circuit further configured to evaluate the change to ascertain the spring travel.

10. A method of measuring a compression travel of an electrically conductive spring, the method comprising:
    making electrical contact with the spring at its ends;
    using the spring as a measurement inductance; and
    detecting and evaluating a change in the measurement inductance, the change caused by the compression travel, in order to ascertain the spring travel.

* * * * *